United States Patent [19]

Moore

[11] Patent Number: 5,267,117
[45] Date of Patent: Nov. 30, 1993

[54] ELECTRICAL PHASE AND AMPLITUDE FAULT DETECTION AND RESPONSE SYSTEM

[75] Inventor: Clifford B. Moore, Senatobia, Miss.

[73] Assignee: Johnson & Wilson Co. Sales and Service, Inc., Collierville, Tenn.

[21] Appl. No.: 723,242

[22] Filed: Jun. 28, 1991

[51] Int. Cl.$^5$ ............................................. H02H 3/26
[52] U.S. Cl. ....................................... 361/77; 361/85; 361/93; 361/116
[58] Field of Search ....................... 361/62, 63, 65, 76, 361/77, 85, 86, 91, 93, 116

[56] References Cited

U.S. PATENT DOCUMENTS

| | | |
|---|---|---|
| 2,425,168 | 8/1947 | Wilcox et al. |
| 2,593,225 | 4/1952 | Van Ryan et al. |
| 2,620,824 | 12/1952 | Slomer |
| 2,752,536 | 6/1956 | Bonine et al. |
| 2,930,938 | 3/1960 | Tapper |
| 2,937,320 | 5/1960 | Easley |
| 3,043,933 | 7/1962 | Weinfurt |
| 3,083,277 | 3/1963 | Tsutsui et al. |
| 3,157,826 | 11/1964 | Norton |
| 3,185,895 | 5/1965 | Easley |
| 3,242,383 | 3/1966 | Opad |
| 3,486,074 | 12/1969 | Rathbun |
| 3,795,842 | 3/1974 | Kovacs |
| 4,027,204 | 5/1977 | Norbeck ................................ 361/1 |
| 4,050,091 | 9/1977 | Goettel ................................. 361/31 |
| 4,060,843 | 11/1977 | Bost ...................................... 361/76 |
| 4,331,995 | 5/1982 | Voss ...................................... 361/85 |
| 4,379,317 | 4/1983 | Conroy, Jr. et al. ................. 361/85 |
| 4,441,135 | 4/1984 | Drain .................................... 361/47 |
| 4,507,713 | 3/1985 | Hsieh .................................... 361/92 |

OTHER PUBLICATIONS

Watt, John H. (Editor), *American Electricians' Handbook, a Reference Book for the Practical Electrical Man*, "Graphical Symbols", Ninth Edition, McGraw-Hill, ca. 1961, pp. 1-12 through 1-19.

*Primary Examiner*—Todd E. DeBoer
*Attorney, Agent, or Firm*—Mason, Fenwick & Lawrence

[57] ABSTRACT

The present invention provides a simple, reliable, comprehensive electrical phase and amplitude fault detection and response system. The system includes means for detecting any of various electrical faults, such as impermissibly low voltage levels, impermissibly high voltage levels, phase dropouts, single-phasing, phase reversals, and/or total power loss. Further, the invention provides both fault detection and response customized to the plant equipment, providing power cut-off an appropriate time after a given fault is detected, and preventing premature power restoration when the line power has not been fully returned to normal. The system provides the fault detection and response functions without the need for electrical power of its own, avoiding dependence on line voltage, batteries or back-up generators. This functioning independent of the presence of electrical power is enabled through use of a pneumatic arrangement for interrupting power to plant equipment.

24 Claims, 3 Drawing Sheets

ELECTRICAL PHASE AND AMPLITUDE FAULT DETECTION AND RESPONSE SYSTEM

BACKGROUND OF THE INVENTION

1. Field of the Invention

The present invention relates to systems for detecting faults in power signals, and responding appropriately. More specifically, the invention relates to systems for detecting phase and/or amplitude faults in multi-phase power lines providing power to equipment at an installation, and responding appropriately to cut off the power to prevent damage to the equipment.

2. Related Art

Suppliers of electricity such as public electric utility companies typically provide electric power to factories and other institutions in the form of a multi-phase AC voltage. Typically, such voltage is a 50 or 60 Hz, three-phase 208/230-volt or 460/480-volt signal.

It is well known that such multi-phase AC voltage is susceptible to a variety of electrical disturbances which may damage equipment at the installation. For example, one or more phases of the voltage may experience a sudden increase or reduction in amplitude. Furthermore, "brown-outs" and power surges may occur. Also, one or more of the phases may actually drop out, or even reverse in phase. And of course, there may be a total loss of power on all phases. Each of these disturbances can induce instantaneous voltages and currents to be experienced in the equipment which can damage costly components, even if the disturbances are experienced only for a short time. The duration of disturbance which equipment can tolerate varies substantially with the type of disturbance and the particular equipment involved.

Various phase or amplitude fault detection systems are known in the art. However, such known systems have typically been unduly complex and, for at least that reason, have lacked in reliability. Further, the response of the known systems have often been inappropriate, cutting power off when such a drastic response was not warranted for a given installation, or, conversely, responding too slowly when a damaging amplitude or phase fault is encountered. Perhaps worst of all, some fault detection systems have lacked the ability to reliably detect a wide range of phase and amplitude faults, allowing continued supply of power which is damaging to plant equipment.

Thus, there is a need in the art to provide a simple, reliable, comprehensive electrical amplitude and phase fault detection and response system which detects any of a variety of amplitude and phase faults, and responds with speed and action appropriate to a particular user's site requirements.

Of equal concern to the owner of the installation equipment is the fact that, after the disturbance is experienced, the supplier may not restore electric power in its proper phases and amplitudes in a uniform manner. For example, after a total power failure, the three phases may not all be restored simultaneously. Further, the amplitudes of each phase may not be uniformly and simultaneously restored to proper levels. These occurrences are of concern, because many known fault detection and/or response systems may not operate properly long after the power failure.

In such systems, when electrical power is interrupted or disturbed to such a degree that the known fault detection or response system itself could not properly operate, the system may not continue to detect the state of the remaining power which still reaches plant equipment, possibly damaging it. Further, after a total power failure, the lack of power to the detection and response system may also lead to equipment damage in the time period immediately after power is restored but before the detection and response system begins to function.

Therefore, there is a need in the art to provide an electrical amplitude and phase fault detection and response system which allows the user to be assured that electrical power has been fully and properly restored before providing that power to plant equipment.

SUMMARY OF THE INVENTION

The present invention is provided to overcome the shortcomings of known systems as described above.

The present invention provides a simple, reliable, comprehensive electrical phase and amplitude fault detection and response system. The system includes means for detecting any of various electrical faults, such as impermissibly low voltage levels, impermissibly high voltage levels, phase dropouts, single-phasing, phase reversals, and/or total power loss. Further, the invention provides both fault detection and response customized to the plant equipment, providing power cut-off an appropriate time after a given fault is detected and preventing premature power restoration when the line power has not been fully returned to normal.

The system provides the fault detection and response functions without the need for electrical power of its own, avoiding dependence on line voltage, batteries or back-up generators. This functioning independent of the presence of electrical power is enabled through use of a pneumatic arrangement for interrupting power to plant equipment. The pneumatic arrangement involves a canister of stored gas such as nitrogen which, when triggered by detection of any of the above-mentioned electrical faults, activates a main power disconnect. The invention further provides means of displaying when there is a fault as well as when the fault has been corrected. Preferably, the main power disconnect remains active until the user affirmatively re-connects power, so that the equipment is not exposed to power before it has been fully restored to normal.

Other objects, features and advantages of the invention will become apparent to those skilled in the art in reading the following Detailed Description of the Preferred Embodiments.

BRIEF DESCRIPTION OF THE DRAWINGS

The invention is better understood by reading the following Detailed Description of the Preferred Embodiments with reference to the accompanying drawing figures, in which:

FIG. 2 shows the relationship of FIGS. 2A and 2B. FIGS. 2A and 2B are hereinafter collectively referred to as FIG. 2.

DETAILED DESCRIPTION OF THE PREFERRED EMBODIMENTS

Figure 1:
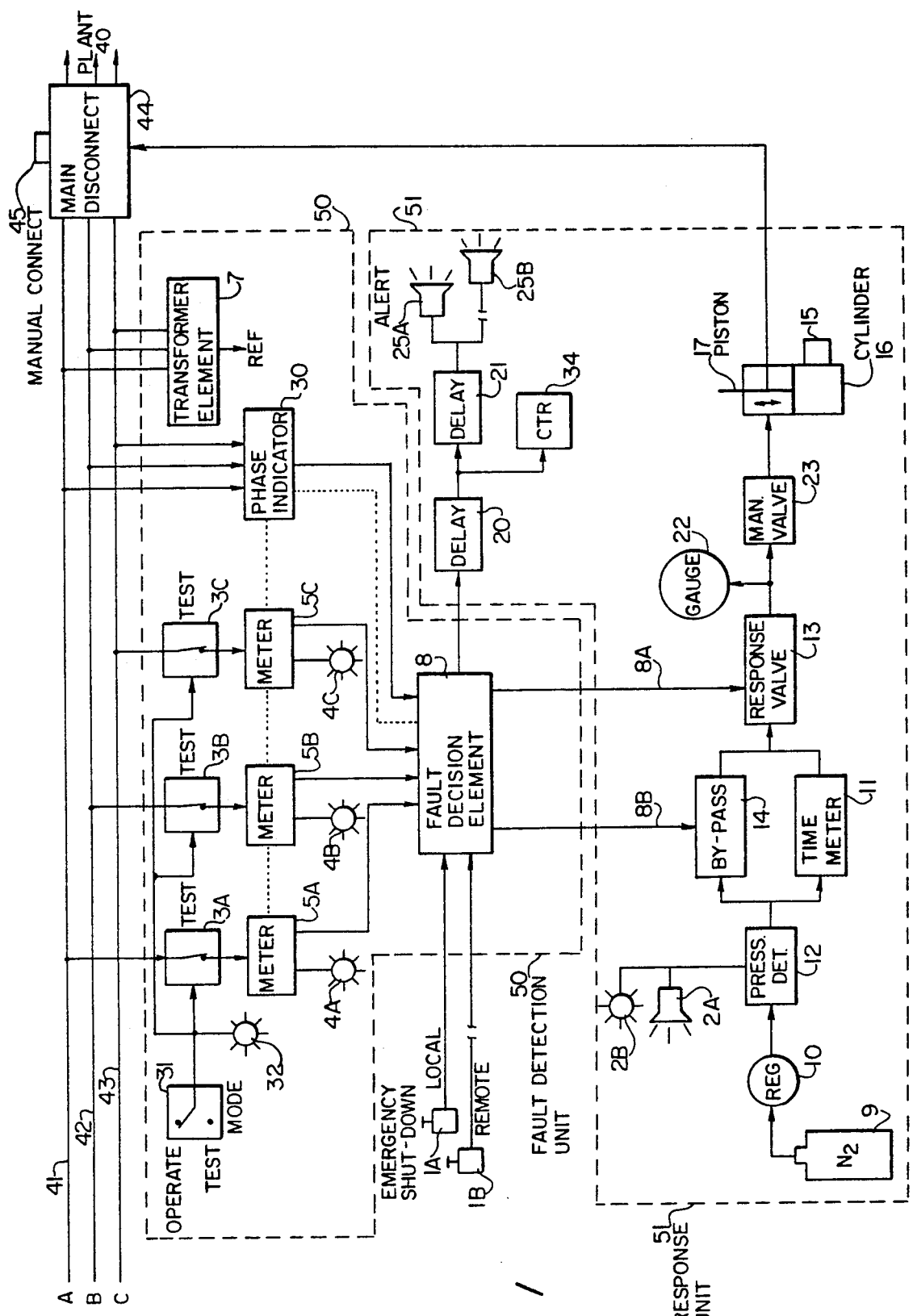
FIG. 1 is a high-level functional block diagram of a preferred embodiment of the electrical phase and amplitude fault detection and response system according to the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose. For example, three-phase AC systems are typically referred to, but the teachings of the present invention are equally applicable to monophase, other polyphase, or DC electrical systems as well. The description of the preferred embodiment focuses on faults in voltage signals, but other faults (such as current faults, load faults, frequency faults) may be monitored as well. Similarly, reference is often made to "equipment" at a "plant", but it is understood that the invention has fields of use involving a broad range of customer equipment and sites. Fields of use such as in protecting only part of the equipment at a plant, or by protecting an area larger than a single plant, are envisioned. Moreover, the functional blocks presented in this specification (such as "fault detection unit" and "response unit") are presented by way of example, for ease in organizing and explaining the principles of the invention, it being understood that there need not be a one-to-one correspondence between disclosed functional blocks and physical, electrical or electronic elements of a concrete embodiment; in fact, different functions may be shared by more than one element, while other elements may actually perform more than one function described herein.

Referring now to FIG. 1, an embodiment of the electrical phase and amplitude fault detection and response system according to the present invention is illustrated in functional block diagram form.

Broadly, the purpose of the illustrated electrical phase and amplitude fault detection and response system is to monitor input electrical phases A, B, and C (labelled 41, 42, 43, respectively) for a variety of phase and amplitude disturbances, and respond appropriately to prevent damage to equipment in a plant 40.

In operation, the input line voltage, typically three-phase AC, is provided on lines 41, 42, 43 by a public utility company or the like. Normally, power passes directly through main disconnect 44 to equipment in plant 40. However, upon detection of one of a given set of phase or amplitude faults of large enough magnitude and persisting longer than a given time threshold, the present system causes main disconnect 44 to be actuated, interrupting power to plant equipment until power is manually restored by manual connect switch 45.

Conceptually, the embodiment may be roughly divided into a fault detection unit 50 and a response unit 51, for performing these respective functions. In the fault detection unit, phase and amplitude fault detection are provided in the following manner.

Meters 5A, 5B, 5C measure the amplitude of respective input phases 41, 42, 43, being connected thereto through respective, normally-closed test switches, 3A, 3B, 3C (described below). Meters 5A, 5B, 5C provide respective amplitude measurement outputs to what is schematically indicated as a fault decision element 8. The provision of independent measurements for each phase allows independent adjustment of how great a voltage deviation is allowed before a fault condition is declared.

Concurrently, input phases 41, 42, 43 pass through a transformer element 7 which provides a constant operational reference voltage (e.g., 115 volts) to the various system components, regardless of the input voltage (e.g., 208/230 or 460/480 volts). The significance of the operational reference voltage is apparent upon review of FIG. 2, described below.

Input phases 41, 42, 43 are also connected to a phase indicator 30. Phase indicator 30 provides signals which indicate the degree to which phase signals 41, 42, 43 approximate ideal phase signals.

Fault decision element 8 forwards a "fault" signal along path 8A to the response unit 51 when the output of meters 5A–5C and/or of phase indicator 30 constitute a fault.

The response unit 51 will now be described. Briefly, a canister 9 of stored gas is connected through a pressure regulator 10 and pressure detector 12 to both a time metering valve 11 and an emergency by-pass valve 14, the last two of which are connected in parallel. Both time metering valve 11 and emergency by-pass valve 14 are connected to a normally closed response valve 13. Response valve 13 passes a gas providing pneumatic pressure, measured by gauge 22, through a normally open manual valve 23 to a cylinder 16, which cylinder directly controls the main disconnect 44. Cylinder 16 is provided with a piston 17, and a filtered exhaust port 15 on the opposite side of the piston as the line from the response unit.

More specifically, the canister 9 of pressurized gas, preferably nitrogen ($N_2$), ultimately provides the pneumatic force for activating the cylinder 16 associated with main disconnect 44. Because the $N_2$ in canister 9 is stored under pressure, typically on the order of 2,000 pounds per square inch (psi), the regulator 10 of standard design is provided at its output. Regulator 10 reduces this pressure to an acceptable level, determined by the particular application. It is understood that use of gas in a pneumatic arrangement is merely a preferred embodiment to which the invention should not be limited, and other means of actuating main disconnect 44, such as hydraulic systems, lie within the contemplation of the invention.

The regulated gas passes through a pressure detector 12. Pressure detector 12 is preferably implemented as a switch which is held in the open position by the gas only when under a sufficiently large gas pressure. A low pressure indicator is provided, in the form of an audible indicator 2A and/or a visual indicator 2B. If the regulated ga pressure falls below a threshold determined by the pressure detector 12, a signal is sent to activate low pressure indicators 2A/2B, alerting maintenance personnel that insufficient regulated pressure is being provided. In this instance, maintenance personnel may take corrective action, such as replacing or recharging canister 9, or repairing or replacing regulator 10.

After passing through pressure detector 12, the pneumatic path connects to a normally closed emergency by-pass valve 14 (described below) and to a normally open time metering valve 11. Time metering valve 12 provides a controlled flow of gas through the system so that cylinder 16 is forced into its active position in a controlled manner, and does not actuate main disconnect 44 instantaneously. Rather, when time metering valve 11 is the only path through which gas flows, there is provided a delay between the detection of a fault and the time when power is finally disconnected. This is advantageous in causing the system to ignore phase or amplitude faults of permissibly short duration. What constitutes a fault of "permissibly short duration" varies with the particular equipment in the user's plant 40. Thus, adjustment of the time metering valve 11 provides a flexible parameter for customizing embodiments of the invention to a variety of user environments.

Response valve 13 receives the "fault" signal on path 8A. Response valve 13 opens the pneumatic path to allow gas to start to pass to the cylinder 16 when an amplitude or phase fault is detected. When time metering valve 11 is the only pathway through which gas flows (that is, when emergency valve 14 is closed), there is provided a pre-chosen time delay from the moment of initial fault detection.

Manual valve 23, disposed at the output of response valve 13, is open in normal operation. However, when it is closed, it provides flexibility in isolating the present system from the main disconnect for maintenance or testing purposes.

Filtered exhaust port 15 is provided on cylinder 16 on the opposite side of the piston 17 as the pneumatic pressure from the response unit 51. Filtered exhaust port 15 allows gas back into the cylinder, but does not play a substantial role in the fault or emergency disconnect operations.

Thus, in summary of the processes of phase and amplitude fault detection and appropriate response, phase indicator 30 and meters 5A-5C provide indications of the phase and amplitude of respective AC phases 41-43 to fault decision element 8. When these elements conclude that a fault has occurred, response valve 13 is opened so that gas can pass from canister 9 through regulator 10 to be metered by metering valve 11 to force cylinder 16 to actuate the main disconnect 44 after a phase or amplitude fault has persisted a period of time determined by the time metering valve 11.

Other features and modes of operation of the embodiment shown in FIG. 1 will now be described.

Advantageously, the present system may be provided with emergency shutdown switches 1A and 1B, which may be momentary electrical switches labelled as "panic buttons". Switch 1A is illustrated as a "local" emergency shutdown switch which is preferably situated on the system control panel. Switch 1B, an optional customer add-on in a preferred embodiment, is illustrated as a remote emergency shutdown switch. If present, switch 1B may be located, for example, near the equipment in plant 40 or in a control booth remote from the system.

When either switch 1A or 1B is pushed by an individual, fault decision element 8 determines there to be a "fault" of some kind. Fault decision element 8 immediately forwards a signal along path 8B to open emergency by-pass valve 14, while simultaneously opening response valve 13 with a signal on path 8A. When this occurs, gas passes directly from canister 9 through the emergency by-pass valve 14, thence through response valve 13 to immediately force cylinder 16 to actuate the main disconnect 44. In this scenario, time metering valve 11 is effectively eliminated from the operation of the system, as all gas immediately by-passes it through emergency by-pass valve 14.

This instantaneous manual shut-down is presumably consistent with the desires of the individual pushing either button 1A or 1B. Instantaneous manual shut-down is to be contrasted with the automated shut-down caused by phase or amplitude faults detected through the use of meters 5A-5C or phase indicator 30. In the case of a detected fault, as described above, it is desirable to provide a suitable delay before automatic shut-down, to prevent short-lived voltage anomalies from needlessly halting plant operations. However, in deference to human judgment, the emergency shut-down switches 1A, 1B are provided to instantaneously shut down equipment due to any perceived problem, including dangers which may have nothing to do with polyphase AC phase and amplitude faults, such as fire or danger of worker electrocution.

As introduced above, it is preferable that the system not automatically restore power to the equipment immediately after it is restored to a normal state. It is preferable that maintenance engineers be allowed to restore the loads gradually, thereby avoiding a sudden overload which itself can damage the equipment. Thus, in the preferred embodiment, the system does not automatically re-connect phases 41, 42, 43 through the main disconnect to allow them reach the plant equipment. Preferably, re-connection is achieved only by using manual connect switch 45.

Advantageously, the system also provides a self-test ability useful for diagnostics and maintenance of the present system. As mentioned briefly above, a set of normally-closed test switches 3A, 3B, 3C is provided between phases 41, 42, 43 and respective meters 5A, 5B, 5C. When closed, test switches 3A-3C provide a conductive path so that the system functions in an operational mode. However, when one of the test switches 3A-3C is opened, an open circuit is presented to the input of a corresponding one of the meters 5A-5C, simulating a drop-out of that particular phase, 41, 42 or 43. This simulated drop-out allows the functioning of various portions of the system to be tested, even without an actual power failure.

In a particular preferred embodiment, the test switches 3A-3C are not always enabled. Instead, there is provided a mode switch 31 having an "Operation Mode" setting and a "Test Mode" setting. When in the Operation Mode, the test switches 3A-3C always present a uniformly closed circuit to the system, even when someone tries to activate one of them. Only in the Test Mode can the test switches 3A-3C simulate a fault. Thus, the mode switch 31 serves a "test switch enable/disable" function. This precaution reduces the possibility of inadvertent plant shut-down by an individual simply wanting to "test the system" while not realizing the consequences of simulating a line fault.

Advantageously, the system provides several indicators for users of the system.

As mentioned above, a visual indicator 2B and/or an audible indicator 2A are provided to indicate insufficient regulated pneumatic pressure is being provided in the response unit.

Further, each meter 5A, 5B, 5C is provided with a respective indicator 4A, 4B, or 4C which is preferably a visual indicator.

A test mode indicator 32, also preferably a visual indicator, is provided to warn individuals that the system is not in operational mode, and that depressing of any of test switches 3A, 3B, 3C will result in power shut-down if maintained sufficiently long.

Additionally, local and/or remote alerting devices 25A, 25B are provided to alert individuals to restoration of power after faults. The alerting devices become activated a first period after the first detection of restoration, the first period being determined by delay device 20. The alarm continues to sound for a second period which is determined by delay device 21. Presumably, only after this alert has sounded will plant personnel re-connect power to plant equipment using manual connect switch 45.

Finally, a counter 34 is provided for counting the number of times a fault is detected. It is preferred that the counter itself be a "nonvolatile memory", retaining its count even through power failures, avoiding the need for a separate power source. This count may be used, for example, to justify complaints to the utility company.

Figure 2A:
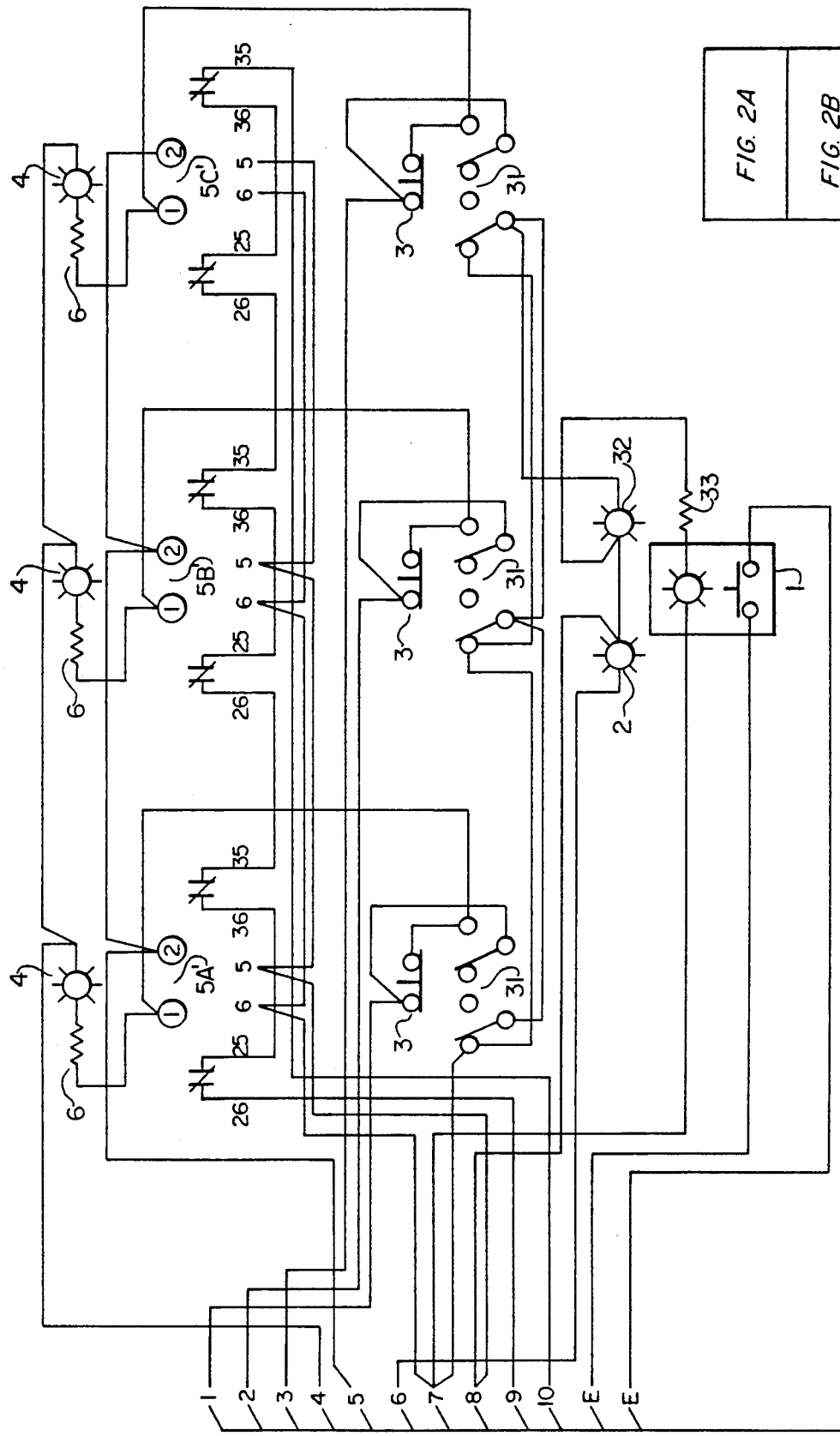
FIGS. 2A and 2B are a diagram showing a particular preferred embodiment of the electrical phase and amplitude fault detection and response system. For brevity.
Figure 2B:
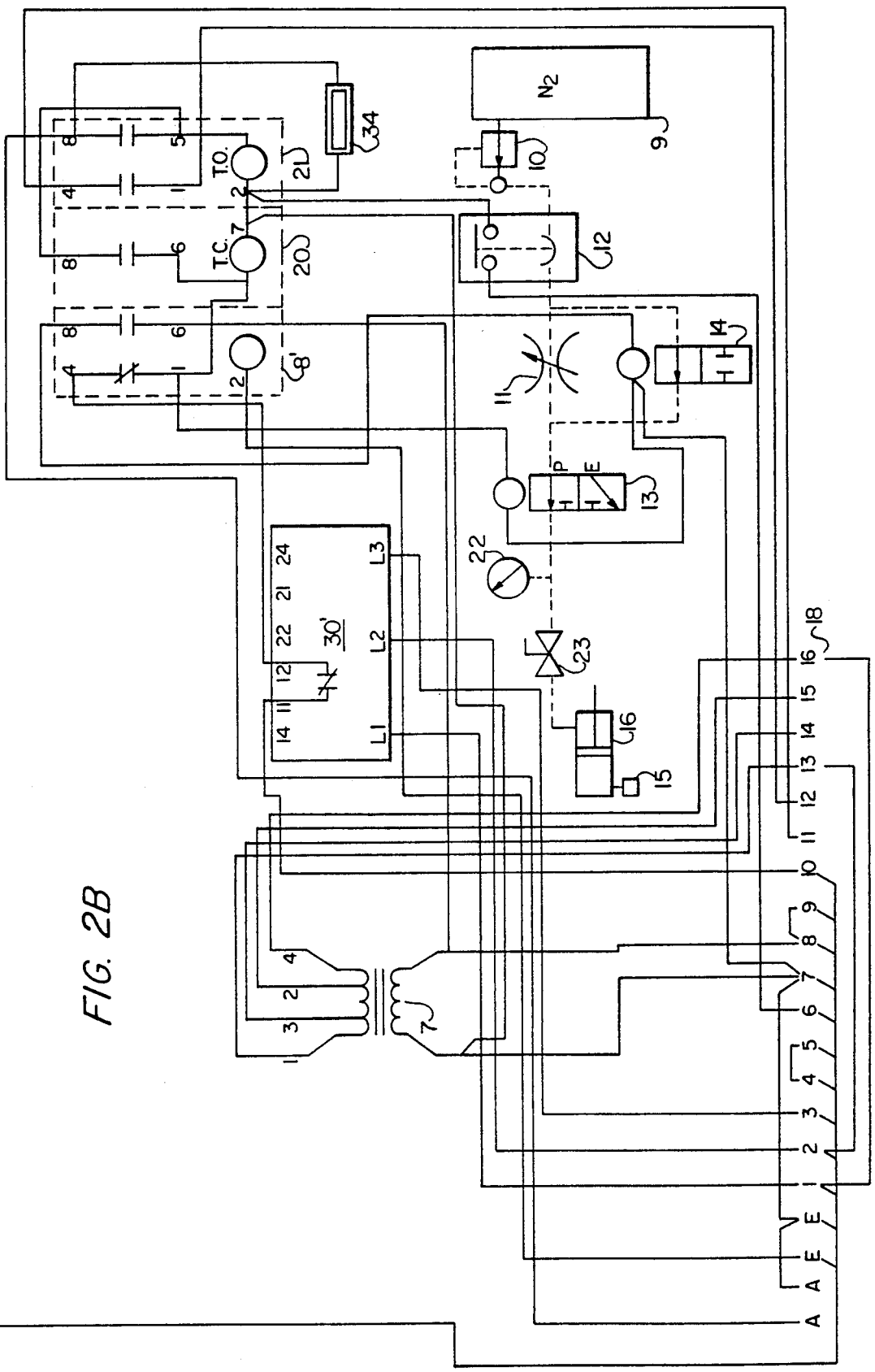

FIGS. 2A and 2B (collectively referred to as FIG. 2) is a circuit diagram of a particular embodiment of the electrical phase and amplitude fault detection and response system which has been described in functional block diagram form in FIG. 1.

Given the foregoing description, those skilled in the art are capable of implementing the functions shown in FIG. 1 in any of a variety of ways. Further, those skilled in the art are readily capable of designing extra functions, eliminating unwanted functions, and altering existing functions, while still remaining within the scope of the present invention. FIG. 2 thus illustrates but one preferred implementation of the invention, variations upon which lie within the ability of those skilled in the art.

Referring now to FIG. 2, an especially preferred hardware embodiment of the invention is illustrated. In this drawing, standard symbols are employed, as illustrated in *American Electrician's Handbook, A Reference Book for the Practical Electrical Man*, Ninth Edition, (McGraw-Hill, ca. 1961), which is incorporated by reference. In keeping with convention, switches and valves are shown in their "normal" positions (normally closed, normally open). For example, the left symbol of relay 8 denotes a normally closed switch, the right symbol, a normally open switch. With exceptions noted below, element reference numerals in FIG. 2 correspond closely to the FIG. 1 functional elements of the same reference numeral. All that needs to be described here is how the FIG. 1 functions are implemented in the particular embodiment of FIG. 2.

It has been described with reference to FIG. 1 that:
(1) meters 5A, 5B, 5C; and
(2) phase indicator 30, provide signals to
(3) fault decision element 8, which provides a decision as to whether a fault has occurred.

This description reflects separation of the measurement and fault detection functions. However, in the FIG. 2 hardware implementation, the measurement and fault detection functions are achieved using series-connected multi-functional elements 5A', 5B', 5C', 30' (each performing both measurement and fault detection). FIG. 1 functional elements 5A, 5B, 5C, 30, and 8 are connected by dotted lines to reflect this possible hardware embodiment.

In particular, FIG. 1 meters 5A, 5B, 5C are implemented in FIG. 2 as meter relays 5A', 5B', 5C' which may be of conventional design (see Table One, below) which combine the amplitude measurement and amplitude fault detection functions. The meter relays allow adjustment of the threshold which determines whether the amplitude of the phase in question (41, 42, 43) has deviated enough to be called a "fault". When protecting equipment of greater sensitivity, the adjustment is made to trigger faults at smaller deviations. Conversely, in protecting more fault-tolerant equipment, the adjustment is made to trigger faults only at substantially large deviations from the normal amplitude. The adjustment of the sensitivity of the metering valves is made by simple adjustment of upper and lower threshold levels provided on any commercially available meter relay such as the one listed in Table One.

In the FIG. 2 implementation, relay 8' simply provides a closed circuit path for a signal to pass to the response valve (solenoid valve) 13. Thus, in the FIG. 2 embodiment, the true decision-making intelligence is resident in the meter relays 5A', 5B', 5C' being serially arranged with solenoid valve 13. Of course, embodiments in which the measuring and fault decision functions are performed by separate elements also lies within the contemplation of the invention.

The phase reversal error detection function is provided in FIG. 2 by a phase reversal relay 30', with relay 8' passively providing a closed circuit path to solenoid valve 13. Phase reversal relay 30 is disposed in series with meter relays 5A', 5B', 5C' to collectively provide fault signal to solenoid valve 13. The detection of a phase-related fault is inherently achieved by a commercially available product such as that listed in Table One. As in the case of amplitude fault detection, described above, embodiments in which the measuring and fault decision functions are performed by separate elements also lies within the contemplation of the invention.

Adjustment of the time threshold after which an amplitude or phase deviation may persist before a fault is declared, is achieved by a trial-and-error adjustment of a commercially available flow control metering valve 11 such as that listed in Table One. Typically, this adjustment is performed once, by an installer in accordance with specifications chosen by the plant owner, and is not generally changed thereafter.

The fault decision function (indicated schematically as element 8 in FIG. 1) is implemented in FIG. 2 as a relay including one normally closed switch and one normally open switch. The normally closed switch is serially connected with meter relays 5A', 5B', 5C' and phased sequence relay 30', which are in series with solenoid valve 13. Thus, any fault detected by meter relays 5A', 5B', 5C' or phased sequence relay 30' causes solenoid valve 13 to open, allowing gas to pass to cylinder 16. The normally open switch activates by-pass valve 14 when an emergency shutdown switch 1A or 1B is depressed. Thus, in this FIG. 2 embodiment, relay 8' does not perform the fault "decision" function, but passes a fault decision signal from elements 5A', 5B', 5C', or 30' to response valve 13. In this embodiment, the fault decision "signal" is the open or closed position of one of a set of series-connected elements 5A', 5B', 5C', 30' so that current does or does not activate the response valve 13.

Relay 8' is thus connected to response valve 13. Response valve 13 is implemented as a normally open solenoid valve which is held in a closed position under electric power. Valve 13 actuates the flow of $N_2$ (or other gas or fluid) to cause cylinder 16 to actuate main disconnect 44.

Emergency by-pass valve 14 is preferably implemented as a solenoid valve, allowing immediate by-pass of the time metering valve. By-pass valve 14 is connected to relay 8, and opens immediately when either of the emergency shutdown switches 1A, 1B is depressed.

In brief, meter relays 5A', 5B', 5C', and 30' adjustably determine which electrical deviations constitute amplitude faults and phase faults, respectively. When a fault is detected, time metering valve 11 adjustably determines how long a fault is tolerated before power is disconnected.

The main disconnect 44 may be implemented as a model as any commercially available unit. Such units include push-button, swing-arm and toggle type switches. The present invention uses any mechanical means by which the motion of piston 17 is translated into action which pushes the button, swings the arm, toggles the switch, and so forth. Mechanical translation of piston motion lies well within the ability of those skilled in the art.

The disconnect is actuated either manually, or automatically by the present system. Preferably, power may only be restored manually.

The self-testing feature is implemented using normally closed momentary switches as test switches 3, arranged as illustrated, parallel to respective double pole double throw switches embodying the Test Mode-/Operate Mode switch 31.

Delay element 20 is implemented as a time-close relay, and delay element 21, as a time-open relay, providing their respective functions of delaying the sounding of a power restoration signal, and determining the signal's duration.

Preferred implementations of each element are illustrated in Table One, of course with the understanding that substitutions may be made by those skilled in the art.

TABLE ONE

| Element No. | Exemplary FIG. 2 Components Implementation |
|---|---|
| 1 | AML 51-F-10R Cap |
|   | AML 31-F-B-A-4 AC Switch |
|   | AML 76-F-10-TO-1P Guard (lamp: 85LP) |
| 2 | GI 5100822 Lamp Sockets (lamp: 120MPLP) |
|   | GI 25P306 Red Lens |
|   | Lamp: 120 MBLP |
| 3 | BZ 2 RQ 1 A 2 Microswitch |
|   | GC 35-436 Plastic caps |
| 4 | GI 5100 822 Lamp Sockets (Lamp: NE51) |
|   | GI 25P306 Green Lens |
|   | Emergency Lamp: 85LP |
| 5' | Crompton 037-302B-0-300V Meter Relays |
| 6 | 0.5 Watt 270K resistor (220 V service) |
|   | 0.5 Watt 150K resistor (115 V service) |
| 7 | General Electric 9T58B42 50VA transformer |
| 8 | Grainger 5X827 Relay |
|   | Grainger 5X852A Socket |
| 9 | 9 Cu.Ft. N$_2$ bottle |
| 10 | Harris Model 1-100 Regulator |
| 11 | F-400B (S-25) Flow Control Metering Valve from ARO |
| 12 | Ashcroft C-124-B-200 Pressure Switch |
| 13 | V55LB2100 Valve from Skinner |
| 14 | V52DB2100 Valve from Skinner |
| 15 | ARO-20312-2 Breather (ARO) |
| 18 | 1492CA2 T-blocks |
|   | 1492N11 Anchor |
|   | 1492N1 3-foot Mounting Channel |
| 20 | Grainger 5X829C On-delay Relay |
|   | Grainger 5X852A Socket |
| 21 | Grainger 5X8529C On-Delay Relay |
|   | Grainger 5X852A Socket |
| 22 | Grainger 2A145 Pressure Gauge |
| 23 | PHV500P-4 0.25-inch Ball Valve |
| 30' | Crompton 252PVRU Phased Sequence Relay |
| 31 | Grainger 2X467 DPDT Switch |
| 32 | GI 5100 822 Lamp SOckets |
|   | GI 25P306 Amber Lens |
|   | Lamp: 120 MBLP |
| 33 | PW 102250 250 Ohm Resistor |
| 34 | Grainger 6X163 Counter |
| 35 | 0.5 Watt 244 Ohm Resistor (for 480 V |

TABLE ONE-continued

| Element No. | Exemplary FIG. 2 Components Implementation |
|---|---|
|   | floating ground systems) |

Terminal block 18 is provided to connect two boards constituting the preferred hardware implementation. A first board, actually a front panel, is illustrated in FIG. 2A. The second board, a back panel, is shown in FIG. 2B. A cable connects the signals between the front panel and the back panel, as indicated by the connection between FIGS. 2A and 2B.

Terminal block 18 includes provision for adding jumpers to allow for different input voltages to be accommodated by a given system. In particular, three 208/230-volt phases 41, 42, 43 are provided on terminals 1, 2, 3 of the terminal block, with two jumpers being installed, between terminals 13 and 14, and between 15 and 16. However, for 460/480 volt service, a single jumper should be connected, between terminals 14 and 15.

The Table Two summarizes the uses of each terminal on the terminal blocks:

TABLE TWO

| Terminal | Terminal Allocations Use |
|---|---|
| 1 | Phase A |
| 2 | Phase B |
| 3 | Phase C |
| 4 | Ground |
| 5 | Ground |
| 6 | Low Pressure Signal |
| 7, 8 | Secondary (reference) voltage from transformer 7 (e.g., 115 volts) |
| 9 | Identical to 8 |
| 10 | Series connection of 5A, 5B, 5C, 30, for response valve 13 |
| 11 | Remote Fault Alert |
| 12 | Remote Fault Alert |
| 13 | Transformer tap 1 |
| 14 | Transformer tap 3 |
| 15 | Transformer tap 2 |
| 16 | Transformer tap 4 |
| A | Remote Alarm 25B |
| E | Remote Emergency Shutdown |

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A electrical phase and amplitude fault detection and response system, for detecting phase or amplitude faults in input power being provided to equipment, and for responding to protect the equipment, the system comprising:
   a) a disconnect unit for selectively disconnecting the input power from the equipment;
   b) a fault detection unit, including:
      1) a meter for measuring an amplitude value for each phase of the input power;
      2) a phase indicator for measuring phase relationships of the input power; and
      3) a fault decision portion, responsive to the meter and phase indicator, for providing a fault decision signal, the fault decision signal including a "fault" signal or a "no-fault" signal; and c) a response unit, including:
1) a source of gas or liquid;
2) a time metering valve, connected to an output of the source; and
3) a normally open response valve, connected to the time metering valve and responsive to the fault decision signal, and to which the disconnect unit is responsive, the response valve functioning so that:
    i) when the fault decision signal is a "fault" signal, the normally open response valve passes the gas or liquid from the source to the disconnect unit to disconnect input power from the equipment after a period of time determined by the time metering valve; and
    ii) when the fault decision signal is a "no-fault" signal, the normally open response valve prevents the gas or liquid from the source to disconnect unit so that power may still be provided to the equipment;

wherein connection or disconnection of input power to the equipment is enabled independently of provision of power to the system itself by operation of the normally open response valve.

2. The system of claim 1, wherein:
a) the system further includes at least one emergency shut-down switch to which the fault decision portion is responsive; and
b) the response unit further includes a by-pass valve, connected in parallel with the time metering valve and responsive to the at least one emergency shut-down switch, for providing a path for the gas or liquid from the source to immediately actuate the disconnect unit without a delay otherwise caused by the time metering valve.

3. The system of claim 1, wherein the response unit further includes:
a regulator for reducing the pressure of gas or liquid from the source, to provide a regulated flow of gas or liquid.

4. The system of claim 3, wherein the response unit further includes:
a pressure detector, connected to the output of the source, for detecting whether the pressure of the regulated gas or liquid is below a certain threshold pressure; and
a low pressure indicator, responsive to the pressure detector, for indicating when the pressure of the regulated gas or liquid is below the threshold pressure.

5. The system of claim 1, wherein the response unit further includes:
a manual valve, located at the output of the response valve, for allowing isolation of the response unit from the disconnect unit.

6. The system of claim 1, wherein the detection unit further includes:
a self-test switch, connected between the input power and a respective one of the meters and to which the respective one of the meters is responsive, for allowing simulation of a fault in the input power.

7. The system of claim 1, wherein the response unit further includes:
a cylinder including a piston, responding to any gas or liquid passed through the response valve by experiencing relative motion of the piston in the cylinder, for actuating the disconnect unit.

8. The system of claim 1, wherein:
the disconnect unit has a manual connect element for restoring input power to the equipment, but does not have any means of automatic restoration of input power responsive to the response system.

9. The system of claim 1, wherein the fault detection unit further includes:
at least one alerting device, responsive to the fault detection unit, for signalling restoration of power after occurrence of a detected fault in the input power.

10. A electrical phase and amplitude fault detection and response system, for detecting phase or amplitude faults in input power being provided to equipment, and for responding to protect the equipment, the system comprising:
a) a disconnect unit for selectively disconnecting the input power from the equipment;
b) a fault detection unit for providing a fault decision signal, the fault decision signal including a "fault" signal or a "no-fault" signal; and
c) a response unit, including:
1) a source of gas or liquid;
2) a time metering valve, connected to an output of the source; and
3) a normally open response valve, connected to the time metering valve and responsive to the fault decision signal, and to which the disconnect unit is responsive, the response valve functioning so that:
    i) when the fault decision signal is a "fault" signal, the normally open response valve passed the gas or liquid from the source to the disconnect unit to disconnect input power from the equipment after a period of time determined by the time metering valve; and
    ii) when the fault decision signal is a "no-fault" signal, the normally open response valve prevents the gas or liquid from the source to disconnect unit so that power may still be provided to the equipment;

wherein connection or disconnection of input power to the equipment is enabled independently of provision of power to the system itself by operation of the normally open response valve.

11. A electrical phase and amplitude fault detection and response system, for detecting faults in input power being provided to equipment, and for responding to protect the equipment by disconnecting the input power from the equipment, the system comprising:
a) a device for determining whether or not a fault has occurred, and for generating a fault decision signal in response to the determination;
b) a substance having motive potential; and
c) a normally open response valve, connected to the substance and responsive to the fault decision signal, for enabling the substance to cause the disconnection of power from the equipment when the fault decision signal is a "fault" signal, the normally open response valve causing disconnection to be performed independently of provision of power to the system itself.

12. The system of claim 11, further comprising:
a disconnect unit for selectively disconnecting the input power from the equipment.

13. The system of claim 11, wherein the device for determining whether or not a fault has occurred includes a fault detection unit, the fault detection unit including:
   1) a meter for measuring an amplitude value for each phase of the input power;
   2) a phase indicator for measuring phase relationships of the input power; and
   3) a fault decision portion, responsive to the meter and phase indicator, for providing a fault decision signal, the fault decision signal including a "fault" signal or a "no-fault" signal.

14. The system of claim 11, wherein the device for determining whether or not a fault has occurred includes:
   a fault detection unit for providing a fault decision signal, the fault decision signal including a "fault" signal or a "no-fault" signal.

15. The system of claim 14, wherein the substance and the response valve are part of a response unit, the response unit including:
   1) a source of gas or liquid which is the substance having motive potential;
   2) a time metering valve, connected to an output of the source; and
   3) the response valve is a normally open solenoid valve connected to the time metering valve and responsive to the fault decision signal, and to which a disconnect unit is responsive, the response valve functioning so that:
      i) when the fault decision signal is a "fault" signal, passing the gas or liquid from the source to the disconnect unit to disconnect input power from the equipment after a period of time determined by the time metering valve; and
      ii) when the fault decision signal is a "no-fault" signal, preventing the gas or liquid from the source to disconnect unit so that power may still be provided to the equipment.

16. The system of claim 11, further comprising:
   a) at least one emergency shut-down switch; and
   b) a by-pass valve, responsive to the at least one emergency shut-down switch, for providing a path for the substance to immediately cause disconnection of power.

17. The system of claim 11, further comprising:
   a regulator for reducing the pressure of a gas or liquid comprising the substance, and for providing a regulated flow of gas or liquid.

18. The system of claim 17, further comprising:
   a pressure detector for detecting whether the pressure of the regulated gas or liquid is below a certain threshold pressure; and
   a low pressure indicator, responsive to the pressure detector, for indicating when the pressure of the regulated gas or liquid is below the threshold pressure.

19. The system of claim 11, further comprising:
   a manual valve, located downstream from the response valve, for preventing the substance from disconnecting power from the equipment by isolating the system therefrom.

20. The system of claim 11, wherein further comprising:
   a self-test switch, connected between the input power and the device for determining whether or not a fault as occurred, for allowing simulation of a fault in the input power.

21. The system of claim 11, further comprising:
   a cylinder including a piston, responding to any of the substance passed through the response valve by experiencing relative motion of the piston in the cylinder, for disconnecting the input power from the equipment.

22. The system of claim 11, wherein the system includes a disconnect unit having a manual connect element for restoring input power to the equipment, but does not include any means of automatic restoration of input power responsive to the response system.

23. The system of claim 11, further comprising:
   at least one alerting device, responsive to the device for determining whether or not a fault has occurred, for signalling restoration of power after occurrence of a detected fault.

24. The system of claim 11, wherein the device for determining whether or not a fault has occurred includes:
   at least one meter relay; and
   a phased sequence relay;
   wherein the at least one meter relay and the phased sequence relay are serially connected with the response valve; and
   wherein the fault decision signal is the opening or closure of the at least one meter relay or phased sequence relay.

* * * * *